Patented Mar. 14, 1939

2,150,689

UNITED STATES PATENT OFFICE 2,150,689

PROCESS FOR PREPARING CELLULOSE ESTERS FROM WOOD PULP

Carl J. Malm, Rochester, N. Y., assignor to Eastman Kodak Company, Rochester, N. Y., a corporation of New Jersey No Drawing. Application February 13, 1937, Serial No. 125,645

4 Claims. (Cl. 260—227)

This invention relates to the preparation of color-free cellulose esters from refined wood pulp.

Ordinarily, in the making of cellulose esters from wood pulp, it is difficult to obtain a color-free product due apparently to substances present in the wood pulp which cause coloration of the ester and thereby affect the transparency of the sheeting or film produced therefrom. If either the original wood pulp or the ester prepared therefrom is given sufficient bleaching to produce a color-free ester, the cellulose is excessively oxidized and the resulting product is usually hazy and has poor physical properties.

An object of my invention is to prepare a cellulose ester from wood pulp which is sufficiently free of color to give satisfactory products and yet the cellulose is not broken down or oxidized. I have found that, if the cellulose ester is prepared in the ordinary manner, except that the reaction mass is maintained for at least one-half hour at 90–110° after the cellulose ester has gone into solution, the materials, which cause the coloration, are converted to a form which is easily bleachable. The ester, after precipitating from solution and washing can then be satisfactorily bleached with a mild bleaching liquor which will not destroy the desirable physical characteristics of the cellulose ester.

Heretofore in the preparation of cellulose esters, the esterification proper has been terminated when the reaction mass was clear or shortly after it has become clear. This practice has failed to convert the color-forming impurities into a readily bleachable form and, therefore, a bleaching treatment is either insufficient to destroy the color or if sufficient, affects the properties of the cellulose ester.

My process is carried out as follows: A refined wood pulp is esterified with the ordinary acylation reagents, such as acetic anhydride, a catlyst such as sulfuric acid, and a solvent, such as acetic acid. After the cellulose has gone into solution, the temperature is held at 90–110° F., preferably 100° F. for at least, one-half hour, preferably one hour, whereupon the solution increases in coloration. It may become a deep straw color or possibly even darker. If the ester is to be subjected to hydrolysis, the hydrolyzing reagents are then added and the hydrolysis is carried out for the required time. The ester is then precipitated from solution and washed to remove the acetic acid. This washing need not be very thorough as a more thorough washing is employed after the bleaching treatment. After the washing the ester is bleached in a mild oxidizing bleach liquor, such as a very dilute solution of chlorine in water. The resulting ester after washing and drying will give solutions free from color and of high clarity in organic solvents.

If desired the cellulose ester may be bleached while it is in solution before the precipitation step. This may be done for instance by incorporating a very small amount of chlorine or hypochlorite in the liquid in which the ester was dissolved. An advantage of dissolving a hypochlorite such as of sodium in the bath is the neutralization of the catalyst thus slowing up or stopping the hydrolysis action. If complete neutralization of the catalyst is desired it may be necessary to also add an alkali metal salt such as sodium acetate or sodium carbonate with the hypochlorite. If desired the chlorine may be added before the completion of the hydrolysis and the bleaching and the hydrolysis could then occur concurrently, after which the ester would be precipitated from solution, washed and dried.

If particular attention must be paid to the viscosity of the final product, it is recommended that the small drop in viscosity which accompanies my process be compensated for either by using cellulose of a little higher cuprammonium viscosity or by abridging the viscosity reducing tendencies of the esterification process or both.

The preferred starting material for use in the esterification process is a refined wood pulp having a high alpha cellulose content, preferably a sulfite pulp. Preparation of a cellulose ester using this type of starting material by a process embodying my invention assures a product substantially free from color.

Under the preferred conditions in which a temperature of 100° F. and an ordinary amount of acylation catalyst is present, I have found that allowing the solution to stand for one hour after esterification is usually quite effective. With a large amount of catalyst, it is preferred to use a lower temperature in the process. If a lower temperature is employed under normal conditions, it is preferred to lengthen the time of treatment, after the dissolving of the cellulose ester. The time of treatment is only limited by the danger of detrimental action on the cellulose itself. As long as the cellulose is not degraded, the treatment may be continued, although for reasons of economy and for the obtaining of the best results, it is preferred that not too long a time of treatment be used.

The following example illustrates a process embodying my invention:

500 lbs. of refined sulfite wood pulp containing 2% of moisture and having an alpha cellulose content of 97% was treated with 2800 lbs. of acetic acid for 4 hours at 100° F. 400 lbs of acetic acid, containing 1500 cc. of sulfuric acid, was then added and the mass was cooled to 65° F. 1400 lbs. of acetic anhydride (85%) was added and the reaction temperature was controlled so that it rose to 100° F. over a period of 2½ hours. The mixture was then kept at 100° F. for an hour or until a clear solution formed. At this stage the esterification of the cellulose is ordinarily regarded as substantially complete. However, to convert the coloring ingredients to an easily bleached form, the mass was maintained at a temperature of 100° F. for one hour and the resulting solution became a deep straw color. 650 lbs. of 50% acetic acid, containing 4000 cc. of sulfuric acid, was then added and the product was hydrolyzed for 45 hours at 100° F. The ester was then precipitated from its solution and given a preliminary washing to remove the main part of the acetic acid therefrom. The ester was then bleached for one hour in a solution of 3 lbs. of chlorine in 20,000 lbs. of water. The ester was separated from the bleaching liquor washed free from acid once and dissolved in 4 parts of acetone, the solution exhibited a color of 125. This color test is based upon comparison with standard color solutions, and is described in "Technical Methods of Analysis" by Griffin.

If the esterification had been carried out in the customary way, there would have been no additional treatment at 100° F. at the end of the esterification. A reaction carried out in the customary manner without the benefit of this subsequent treatment but with a bleaching treatment with chlorine similar to that described in the example, gave a product whose solution in 4 parts of acetone gave a color value of 250.

Instead of chlorine, other oxidizing bleaching agents, such as acidified hypochlorite solutions, or peroxide or permanganate bleaches, might be employed. The concentration of chlorine may be varied depending upon the amount of bleaching necessary and the conditions of operation. It is preferred that the concentration of chlorine be approximately that specified in the example—namely, .015% of available chlorine under the usual conditions of operation.

My invention relates also to processes of preparing other organic acid esters of cellulose than cellulose acetate, particularly the lower fatty acid esters, such as cellulose acetate propionate, cellulose acetate butyrate or the propionates or butyrates of cellulose. In some of those cases the product is originally acetone soluble and, consequently, the hydrolysis step will not be necessary between the treatment of the clear solution and the precipitation.

The product resulting from an esterification process, embodying my invention, is eminently suitable for use in making any commercial product in which optimum transmission of light is desired. For instance, with transparent sheeting or photographic film, it is usually desirable that the ester employed in their preparation be as free of color as possible. Also, in the making of yarn, it is desirable that there be very little coloration, to avoid any effect on the dyeing of the yarn and to assure the uniformity of shade from one batch of material to the next. The freeness from color of the cellulose ester layer used in laminated glass is also important and, therefore, my ester is eminently suited for use in this connection.

I claim:

1. The process for preparing a lower fatty acid ester of cellulose having a good color value from refined wood pulp which comprises acylating the pulp with lower fatty acid compounds, prior to the addition of the hydrolyzing reagents maintaining the reaction mass at 90–110° F. for at least one-half hour after the pulp has completely dissolved in the esterification bath, and subsequently bleaching the ester with a very mild oxidizing bleach which substantially eliminates coloration from the ester.

2. The process for preparing a lower fatty acid ester of cellulose having a good color value from refined wood pulp which comprises acylating the pulp with lower fatty acid compounds, prior to the addition of the hydrolyzing reagents maintaining the reaction mass at 90–110° F. for at least one-half hour after the pulp has completely dissolved in the esterification bath, and subsequently bleaching the ester with a very mild chlorine bleach which substantially eliminates coloration from the ester.

3. The process for preparing a lower fatty acid ester of cellulose having a good color value from refined wood pulp which comprises acylating the pulp with the lower fatty acid compounds, prior to the addition of the hydrolyzing reagents maintaining the reaction mass at 100° F. for approximately one hour after the pulp has completely dissolved in the esterification bath, and subsequently bleaching the ester with a very mild chlorine bleach which substantially eliminates coloration from the ester.

4. The process for preparing a cellulose acetate having a good color value from refined wood pulp which comprises acylating the pulp, prior to the addition of the hydrolyzing reagents maintaining the reaction mass at 90–110° F. for at least one-half hour after the pulp has completely dissolved in the esterification bath and subsequently bleaching the ester with a very mild chlorine bleach which substantially eliminates coloration from the ester.

CARL J. MALM.